UNITED STATES PATENT OFFICE.

GRIGORI PETROFF, OF PETROGRAD, RUSSIA, ASSIGNOR TO TWITCHELL PROCESS COMPANY, OF CINCINNATI, OHIO.

PROCESS OF TREATING MINERAL OILS.

1,233,700.      Specification of Letters Patent.      Patented July 17, 1917.

No Drawing.      Application filed September 10, 1915. Serial No. 49,907.

*To all whom it may concern:*

Be it known that I, GRIGORI PETROFF, a subject of the Czar of Russia, and residing at Petrograd, Russia, have invented a certain new and useful Improvement in Processes of Treating Mineral Oils, of which the following is a specification.

It is a well known fact that the production of lighting oils from petroleum is usually effected in two successive operations or stages, *i. e.* (*a*) fractional distillation and (*b*) purification of the respective fractions by means of sulfuric acid and lye. This process is open to the objection that the resulting distillates of the lighting and other oils possess an unpleasant odor.

The odorous substances in petroleum distillates are very stable, and are not decomposed by such reagents as sulfuric acid and lye, even when fuming sulfuric acid is used, and consequently they can be removed only with considerable difficulty.

The object of my invention is to provide a petroleum refining process which will remove undesirable and odorous bodies, which generally characterize the distillates, and the invention comprises a process of purifying the oil and producing a stable, light, substantially odorless and tasteless oil of neutral character, suitable for commercial use or distillation.

These undesirable components can be removed or reduced by sulfonating the mineral oil with strong or fuming sulfuric acid. The treated mineral oils settle into a sludge layer and a supernatant oil body containing sulfonic acid, and sulfurous acids, and these residual acids have to be removed. To effect this successfully I have discovered that it is necessary to subject the oil containing residual acids to a solution treatment, and a neutralizing treatment, both treatments being necessary in order to avoid the formation of tenacious emulsions, rendering the oil separation very difficult. The formation of a firm emulsion in the supernatant oil would render it difficult to obtain either a clean-cut precipitation of residual acids in the oil or clean-cut specific gravity separations in the oil, and therefore the treatments must be such as will not tend to produce emulsions rendering it difficult to separate the oil from the residual acids or from treatment solutions.

In general, therefore, my process comprises the treatment of the mineral oils with strong sulfuric acid, the removal of the resultant sludge or acid tar, the treatment of the supernatant oil containing residual acids with an emulsification preventing solvent in which the residual acids readily dissolve and in which the oil is relatively insoluble, and treatment with an alkali, whereby the oil is neutralized and the residual acids are removed without forming emulsions, and so enabling the treated oil to be readily and cleanly separated, an operation which would be difficult if not impracticable on a large scale and on a commercial basis if there were emulsification formations present in the treated oil.

The ultimate oil so produced is neutral, non-emulsifying, stable, of light color, of great purity, leaves no residue when burnt, is available for commercial purposes, or usable for distillation without the formation or odorous or undesirable bodies, and producing superior distillates.

The quality of the products obtained depends somewhat on the strength and volume of sulfuric acid used, and the particular characteristics of the mineral oil to be treated.

The sulfonic acids residual in the supernatant oil or alkali compounds, are soluble in aqueous alcohol, while the unattacked portions of the oil are relatively insoluble in the aqueous alcohol. The sulfonic bodies have rapid and stable emulsification tendencies, and this emulsification formation, which would render oil separation difficult, is prevented by the aqueous alcohol solution treatment, it being also necessary to treat with lye or alkali to insure the entire removal of residual acids and the production of a neutral product.

To illustrate a practical way of working the process on a commercial scale and to indicate relative proportions to be employed with a given mineral oil, the following example will suffice:

In order to purify 10,000 kgs. of Baku mineral oils, specific gravity 0.879, 2,500 kgs. of fuming sulfuric acid are used, gradually administered, in 500 kgs. successive treatments. Preferably this sulfonation is given in five treatments, and the deposited acid tar or sludge is removed after each sulfonating treatment. The supernatant oil after sludge removal, containing residual acids, is mixed with 500 kgs. of dilute alcohol, or acetone (two parts water, one part alcohol). After settling, separate the aqueous alcohol solution from the oil, and treat the oil with an alkali, such as lye and water, until the oil is completely neutralized, the residual acids are thus removed from the oil, and the oil is neutral. It is separated from the residual acids and can be separated from the treatment solutions, and the products of alkali wash, because there are no emulsions present tending to hold the oil and the treatment solutions in close adhesion.

What I claim is:—

1. A process of refining mineral oils comprising treatment with sulfuric acid, permitting the treated material to separate into a sludge layer and a supernatant oil layer containing residual acids, removing the sludge, treating the supernatant oil with an emulsification preventing solvent in which the residual acids are readily soluble and the oil relatively insoluble, and with an alkali, and separating the oil from the solvent and from the products of reaction.

2. A process of refining mineral oils comprising treatment with sulfuric acid, permitting the treated material to separate into a sludge layer and a supernatant oil layer containing residual acids, removing the sludge, and removing the residual acids from the supernatant oil by subjecting the oil to the action of an emulsification preventing solvent of the residual acids in which the oil does not readily dissolve, and to the action of an alkali, and separating the oil from the solution and from the products of reaction.

3. A process of refining mineral oils comprising treatment with sulfuric acid, permitting the treated material to separate into a sludge layer and a supernatant oil layer containing sulfonation residuals, removing the sludge, removing the sulfonation residuals from the supernatant oil and rendering the oil suitable for distillation by mixing the oil with an aqueous solution of an alcohol to prevent emulsification formations and by treatment with a solution of an alkali, and separating the oil from the treatment solutions.

In testimony whereof I affix my signature in presence of two witnesses.

GRIGORI PETROFF.

Witnesses:
  H. A. LOVIAGUINE,
  AUG. MIGKIS.